United States Patent [19]

Kersting et al.

[11] Patent Number: 6,114,478
[45] Date of Patent: Sep. 5, 2000

[54] GAS-PHASE POLYMERIZATION OF $C_2$-$C_8$-ALK-L-ENES BY MEANS OF ZIEGLER-NATTA OR METALLOCENE CATALYST SYSTEMS

[75] Inventors: Meinolf Kersting, Neustadt; Rainer Alexander Werner, Bad Dürkheim; Franz Langhauser, Ruppertsberg; Gerald Lutz, Darmstadt, all of Germany

[73] Assignee: BASF Aktiengesellschaft, Ludwigshafen, Germany

[21] Appl. No.: 08/989,010

[22] Filed: Dec. 11, 1997

[30] Foreign Application Priority Data

Sep. 25, 1997 [DE] Germany ............... 196 53 079

[51] Int. Cl.[7] ....................................... C08F 2/34
[52] U.S. Cl. ................. 526/88; 526/901; 422/135; 422/136; 422/138
[58] Field of Search ................ 526/88, 901; 422/138, 422/135, 136

[56] References Cited

U.S. PATENT DOCUMENTS

| | | | |
|---|---|---|---|
| 4,012,573 | 3/1977 | Trieschmann et al. | 526/68 |
| 4,330,645 | 5/1982 | Juza et al. | 526/61 |
| 4,794,096 | 12/1988 | Ewen . | |
| 4,857,613 | 8/1989 | Zolk et al. . | |
| 5,288,824 | 2/1994 | Kerth et al. . | |
| 5,371,260 | 12/1994 | Sangokoya . | |
| 5,391,793 | 2/1995 | Marks et al. . | |

FOREIGN PATENT DOCUMENTS

| | | |
|---|---|---|
| 2223641 | 1/1997 | Canada . |
| 000 512 | 2/1979 | European Pat. Off. . |
| 31 417 | 7/1981 | European Pat. Off. . |
| 38 478 | 10/1981 | European Pat. Off. . |
| 45 975 | 2/1982 | European Pat. Off. . |
| 45 977 | 2/1982 | European Pat. Off. . |
| 67 359 | 12/1982 | European Pat. Off. . |
| 86 473 | 8/1983 | European Pat. Off. . |
| 171 200 | 7/1986 | European Pat. Off. . |
| 284 708 | 10/1988 | European Pat. Off. . |
| 360 094 | 3/1990 | European Pat. Off. . |
| 621 279 | 10/1994 | European Pat. Off. . |
| 633 264 | 1/1995 | European Pat. Off. . |
| 749992 | 12/1996 | European Pat. Off. . |
| 2 049 622 | 4/1972 | Germany . |
| 41 30 299 | 3/1993 | Germany . |
| 2 111 066 | 6/1983 | United Kingdom . |
| 91/09882 | 7/1991 | WIPO . |
| 95/22565 | 8/1995 | WIPO . |

OTHER PUBLICATIONS

Merriam–Webster's Collegiate Dictionary, Tenth Edition, p. 1320, 1997.

Jr. of Organ. chem. 369, (1989) 359–370.

*Primary Examiner*—David W. Wu
*Assistant Examiner*—Roberto Rabago
*Attorney, Agent, or Firm*—Keil & Weinkauf

[57] ABSTRACT

A process for the homo- or copolymerization of $C_2$–$C_8$-alk-1-enes by means of a Ziegler-Natta or a metallocene catalyst system in a stirred bed of finely divided polymer from the gas phase, the transition metal-containing catalyst solid of the Ziegler-Natta or metallocene catalyst system being fed to the reactor by $C_2$–$C_8$-alk-1-ene metered into the reactor, wherein the transition metal-containing catalyst solid, together with at least some of the $C_2$–$C_8$-alk-1-ene, is fed to the reactor through one or more pipes which project perpendicularly or virtually perpendicularly from above into the gas space and end above the pulverulent stirred reactor bed.

5 Claims, 1 Drawing Sheet

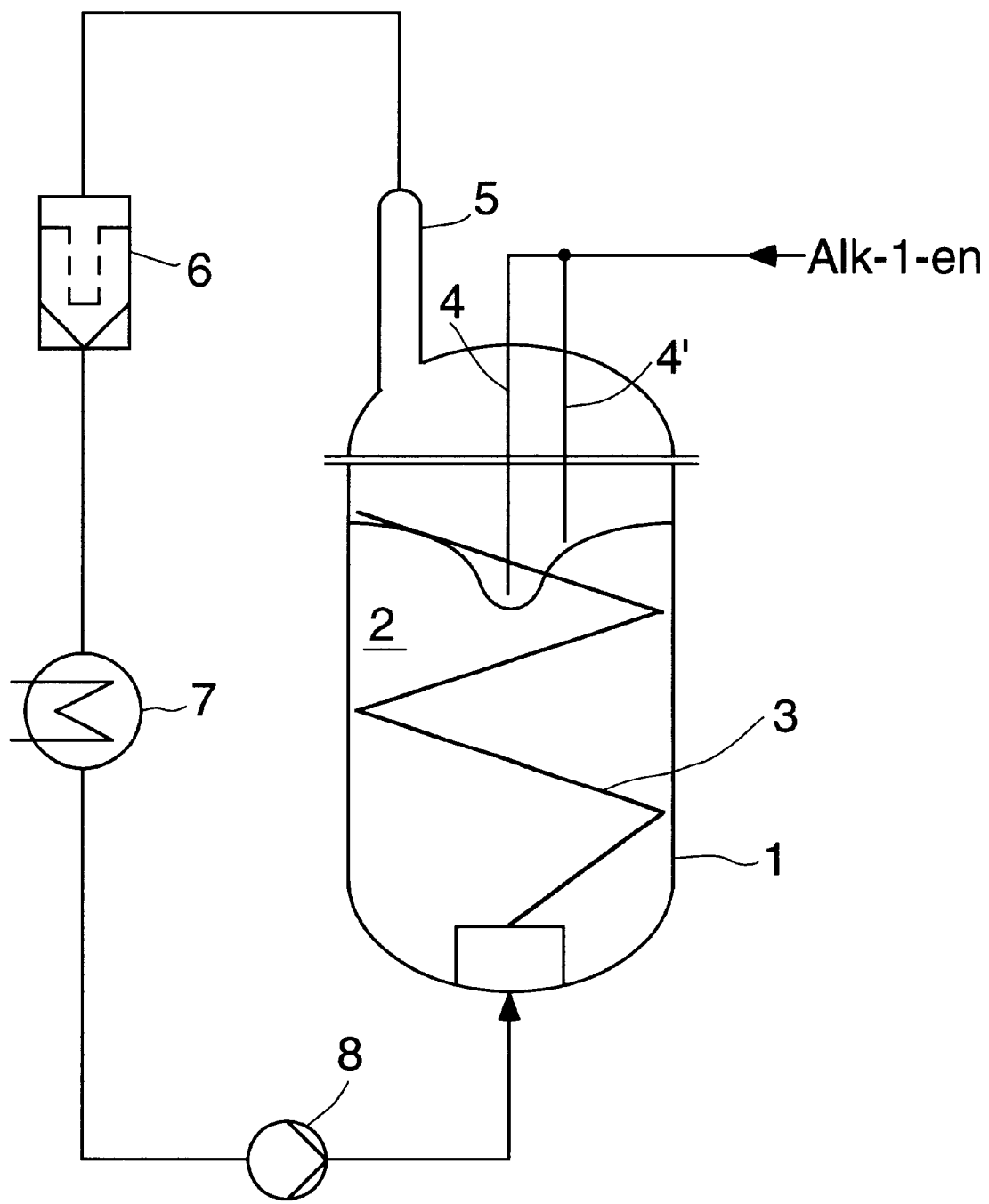

GAS-PHASE POLYMERIZATION OF C$_2$-C$_8$-ALK-L-ENES BY MEANS OF ZIEGLER-NATTA OR METALLOCENE CATALYST SYSTEMS

The present invention relates to a process for the homo- or copolymerization of C$_2$–C$_8$-alk-1-enes by means of a Ziegler-Natta or a metallocene catalyst system in a stirred bed of finely divided polymer from the gas phase, the transition metal-containing catalyst solid of the Ziegler-Natta or metallocene catalyst system being fed to the reactor by a C$_2$–C$_8$-alk-1-ene metered into the reactor.

The present invention furthermore relates to an apparatus for the polymerization of C$_2$–C$_8$-alk-1-enes.

Polymers of C$_2$–C$_8$-alk-1-enes can be prepared both by liquid-phase polymerization and by polymerization of a suspension or by gas-phase polymerization. Owing to the ease of separating the resulting solid polymer from the gaseous reaction mixture, polymerization is increasingly being carried out from the gas phase. The polymerization is carried out with the aid of a Ziegler-Natta catalyst system which usually consists of a titanium-containing solid component, an organic aluminum compound and an organic silane compound (EP-B 45 977, EP-A 171 200, U.S. Pat. No. 4,857,613, U.S. Pat. No. 5,288,824). However, it is also possible to use Ziegler-Natta catalysts based on metallocene catalyst systems. Such metallocene catalyst systems are disclosed, inter alia, in DE-A 41 30 299.

DE-A 20 49 622 describes a process for the polymerization of, inter alia, C$_2$–C$_6$-alk-1-enes in the gas phase in the presence of polymerization catalysts, in which the gaseous monomers are removed continuously from the gas phase, condensed in a closed system, stored and recycled in liquid form in controlled amounts by means of a pump.

EP-A 38 478 discloses a preferred embodiment of the polymerization process described in DE-A 20 49 622, the preparation of the homo- or copolymers being effected in a concentric stirred bed which fulfils certain geometric conditions. Further embodiments of the abovementioned process are described in EP-A 67 359 and EP-A 360 094.

With the aid of these processes, it is possible to prepare, in an economical manner, a large number of homo- or copolymers of C$_2$–C$_8$-alk-1-enes, which have good performance characteristics. However, it has been found that the transition-metal containing catalyst solid metered in very small amounts into the reactor is still insufficiently mixed into the stirred bed. Disadvantages which result from this are an inhomogeneous temperature distribution within the stirred bed and the occurrence of hot spots, ie. spots with very high local temperatures in some cases. Particularly as a result of high local temperatures, the catalyst system is irreversibly damaged and loses some of its activity.

BRIEF SUMMARY OF THE INVENTION

It is an object of the present invention to remedy the disadvantages described and to provide a process which permits substantially better mixing in of the transition metal-containing catalyst solid.

We have found that this object is achieved by a novel process for the homo- or copolymerization of C$_2$–C$_8$-alk-1-enes by means of a Ziegler-Natta or a metallocene catalyst system in a stirred bed of finely divided polymer from the gas phase, the transition metal-containing catalyst solid of the Ziegler-Natta or metallocene catalyst system being fed to the reactor by C$_2$–C$_8$-alk-1-ene metered into the reactor, wherein the transition metal-containing catalyst solid, together with at least some of the C$_2$–C$_8$-alk-1-ene, is fed to the reactor through one or more pipes which project perpendicularly or virtually perpendicularly from above into the gas space and end above the pulverulent reactor bed.

The novel process is carried out in a gas-phase reactor which is filled with a pulverulent reaction bed comprising finely divided polymer which is kept in motion by means of a stirrer, self-supporting helical ribbon impellers being particularly suitable. Such stirrers are disclosed, inter alia, in EP-B 000 512 and EP-B 031 417. They are distinguished in particular by the fact that they distribute the pulverulent reaction bed very homogeneously. Examples of such pulverulent reaction beds are described in EP-B 038 478. The kettle-like reactors provided with a stirrer preferably have a capacity of from 0.1 to 100 m$^3$, for example 12.5, 25, 50 or 75 m$^3$.

In the novel process, the transition metal-containing catalyst solid is fed to the reactor by a part-stream or the total amount of the C$_2$–C$_8$-alk-1-ene metered into the reactor. The addition is effected through one or more pipes which project perpendicularly or virtually perpendicularly from above into the gas space of the polymerization reactor and end above the pulverulent reactor bed. The inclination of the pipes relative to the vertical (reactor middle) should be less than 30°, preferably less than 20°. The transition metal-containing catalyst solid is added to the monomer stream by a suitable apparatus and then metered to the powder bed from above by said monomer stream by means of the pipe or pipes designed according to the invention.

The vertical distance between the pipe end or ends and the pulverulent reactor bed is preferably less than 15%, in particular less than 10%, of the distance between the upper reactor end and the surface of the stirred pulverulent reactor bed. Viewed in the radial direction, the feed pipe or pipes advantageously ends or end in the middle of the reactor or slightly eccentrically in a manner such that the horizontal distance between the pipe end or ends and the middle of the reactor is less than 20, preferably less than 15, % of the radius of the reactor.

BRIEF DESCRIPTION OF THE DRAWING

A particularly preferred embodiment of the novel process is shown schematically in the FIGURE. C$_2$–C$_8$-alk-1-enes are homo- or copolymerized in a stirred reactor (1) which is filled with a finely divided reaction bed (2) consisting of solid polymer particles, for example having a particle size of from 0.05 to 10 mm, and is provided with a self-supporting helical ribbon impeller (3). Unconsumed, gaseous monomers are removed from the top of the reactor, ie. at the upper reactor end, initially via a reactor dome (5), and then separated from entrained polymer particles by means of a circulating gas filter (6). The monomers are then liquefied with the aid of a heat exchanger (7) and are recycled by means of a pump (8) to the reactor (1) as liquids or as a two-phase mixture, where they rapidly vaporize under the prevailing conditions. By means of this circulation together with the evaporator cooling by the monomers introduced in liquid form, the heat of reaction evolved during the polymerization can be rapidly removed and thorough mixing of the pulverulent reaction bed with monomers can be ensured.

In order to replace consumed monomers, fresh C$_2$–C$_8$-alk-1-enes are fed to the reactor. These may be metered into the reactor as a total stream or as a plurality of part-streams, in this particularly preferred embodiment of the novel process the transition metal-containing catalyst solid being added either to the total stream or to a part-stream of the freshly introduced C$_2$–C$_8$-alk-1-ene.

The stirring movement of the self-supporting helical ribbon impeller (3) causes the finely divided reaction bed to rotate. Owing to the particular design of the impeller, this radial movement of the polymer particles is also superposed with a horizontal one in which the small-particled polymer is moved upward in the peripheral region of the stirred bed and downward in the central region of the stirred bed. This results in the formation of a funnel-like depression in the reaction bed (2) in the middle of the reactor. The $C_2$–$C_8$-alk-1-ene stream containing the transition-metal-containing catalyst solid is metered into the reactor through the pipes (4) and/or (4'), whose end(s) are aligned either concentrically at the middle of the funnel or slightly eccentrically at the funnel edge.

The novel process can be carried out in a single gas-phase reactor. However, it is also possible to use a cascade of gas-phase reactors. In this case, the transition metal-containing catalyst solid is as a rule metered only into the first reactor and then transferred, in still active form, together with the polymer formed in the first reactor and unconverted monomer, to the next reactor of the cascade. However, it is also possible to meter additional catalyst solid into further reactors or each reactor of the cascade.

The apparatus, which is likewise novel, is to be understood as meaning a reactor for the polymerization of $C_2$–$C_8$-alk-1-enes in a stirred bed of finely divided polymer from the gas phase or a cascade of such reactors, at least one of the reactors having at least one pipe projecting perpendicularly from above or virtually perpendicularly from above into the gas space, and this pipe ending above the stirred pulverulent reactor bed, the pipe or pipes being designed in such a way that $C_2$–$C_8$-alk-1-enes can flow through them and they are equipped with a suitable apparatus for adding transition metal-containing catalyst solids to the $C_2$–$C_8$-alk-1-ene stream.

The novel process is suitable for the polymerization of $C_2$–C8-alk-1-enes with the aid of a Ziegler-Natta or metallocene catalyst system. $C_2$–$C_8$-Alk-1-enes are understood as meaning in particular ethylene, propylene, but-1-ene, pent-1-ene, hex-1-ene, hept-1-ene or oct-1-ene, ethylene, propylene or but-1-ene being preferably used. The novel process is particularly suitable for the preparation of homopolymers of propylene and of copolymers of propylene with up to 30% by weight of polymerized other $C_2$–$C_8$-alk-1-enes.

Propylene homopolymers or random copolymers of propylene with up 15% by weight of other $C_2$–$C_8$-alk-1-enes are preferably prepared by the novel process. Also preferred is the preparation of block or impact copolymers of propylene in a process which comprises at least two stages and in which, in the first stage, propylene is homopolymerized or is copolymerized with up to 15% by weight of other $C_2$–C8-alk-1-enes and, in the second stage, a propylene/ethylene copolymer which has ethylene contents of from 15 to 80% by weight and may additionally contain further $C_2$–$C_8$-alk-1-enes is polymerized with the product from the first stage.

Suitable polymerization catalysts in the novel process are Ziegler-Natta catalyst systems or metallocene catalyst systems. Catalyst systems used in particular are those which, in addition to a transition metal-containing solid component which contains a carrier a), a titanium compound b) and an electron donor compound c), also contain cocatalysts in the form of organic aluminum compounds d) and, if required, electron donor compounds c'). However, it is also possible to use Ziegler-Natta catalyst systems based on metallocene catalyst systems. These contain, as a rule, an inorganic carrier A), at least one metallocene complex B), at least one compound C) forming metallocenium ions and, if required, at least one organic metal compound D) of an alkali metal or alkaline earth metal or of a metal of main group III of the Periodic Table.

In general, halides or alcoholates of trivalent or tetravalent titanium are used as titanium compounds b) for the preparation of the titanium-containing solid component of the Ziegler-Natta catalyst systems, chlorides of titanium, in particular titanium tetrachloride, being preferred. Advantageously, the titanium-containing solid component contains a finely divided carrier a), for which silicas and aluminas as well as aluminum silicates of the empirical formula $SiO_2.aAl_2O_3$, where a is from 0.001 to 2, in particular from 0.01 to 0.5, have proven useful.

The preferably used carriers have a particle diameter of from 0.1 to 1000 μm, in particular from 10 to 300 μm, a pore volume of from 0.1 to 10, in particular from 1.0 to 5.0, $cm^3/g$ and a specific surface area of from 10 to 1000, in particular from 100 to 500, $m^2/g$.

Inter alia, compounds of magnesium a') are furthermore used in the preparation of the titanium-containing solid component. Particularly suitable compounds of this type are magnesium halides, in particular chlorides or bromides, or magnesium compounds from which the halides can be prepared in a conventional manner, for example by reaction with hydrogen chloride or chlorine, for example alkylmagnesiums and arylmagnesiums as well as alkoxymagnesium and aryloxymagnesium compounds. Magnesium chloride, magnesium bromide and di-$C_1$–$C_{10}$-alkylmagnesium compounds are particularly preferably used. It is also possible to prepare the transition metal-containing catalyst solid of the Ziegler-Natta catalyst system without carrier a), exclusively based on magnesium compounds a').

As a rule, electron donor compounds c), for example mono- or polyfunctional carboxylic acids, carboxylic anhydrides and carboxylic esters, ketones, ethers, alcohols, lactones and organophosphorus and organosilicon compounds, are also used in the preparation of the titanium-containing solid component. Phthalic acid derivatives of the general formula I

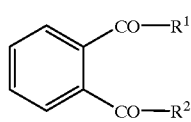

where $R^1$ and $R^2$ are each chlorine or $C_1$-$C_{10}$-alkoxy or together are oxygen, are preferably used as electron donor compounds c) within the titanium-containing solid component. Particularly preferred electron donor compounds are phthalic esters, where $R^1$ and $R^2$ are each $C_1$–$C_8$-alkoxy, for example methoxy, ethoxy, propoxy or butoxy.

Further preferred electron donor compounds c) within the titanium-containing solid component include diesters of 3- or 4-membered, unsubstituted or substituted cycloalkane-1,2-dicarboxylic acids and monoesters of unsubstituted or substituted benzophenone-2-carboxylic acids. Hydroxy compounds used in the case of these esters are the alcohols usually used in esterification reactions, including $C_1$–$C_{15}$-alkanols, $C_5$–$C_7$-cycloalkanols, which in turn may carry $C_1$–$C_{10}$-alkyl groups, and phenols, naphthols and the $C_1$–$C_{10}$-alkyl derivatives of these compounds.

The titanium-containing solid component can be prepared by methods known per se. Examples of these are described, inter alia, in EP-A 45 975, EP-A 86 473, EP-A 171 200, GB-A 2 111 066 and U.S. Pat. No. 4,857,613.

In the preparation of the titanium-containing solid component, the process disclosed in U.S. Pat. No. 5,288,824 is preferably used.

The titanium-containing solid component obtainable in this manner is used with cocatalysts as a Ziegler catalyst system. Suitable cocatalysts are organic aluminum compounds d) and electron donor compounds c').

Suitable aluminum compounds d) in addition to trialkylaluminum are those compounds in which one alkyl group is replaced by an alkoxy group or by a halogen atom, for example by chlorine or bromine.

Trialkylaluminum compounds whose alkyl groups are each of 1 to 8 carbon atoms, for example trimethyl-, triethyl- or methyldiethylaluminum, are preferably used.

In addition to the aluminum compound d), electron donor compounds c') are also preferably used as further cocatalysts, for example mono- or polyfunctional carboxylic acids, carboxylic anhydrides and carboxylic esters, ketones, ethers, alcohols, lactones and organophosphorus and organosilicon compounds. Particularly suitable compounds c') are organosilicon compounds of the general formula II $$R^3{}_n Si(OR^4)_{4-n} \quad \text{II}$$

where $R^3$ are identical or different and are each $C_1$–$C_{20}$-alkyl, 5- to 7-membered cycloalkyl, which in turn may carry a $C_1$–$C_{10}$-alkyl group, or $C_6$–$C_{20}$-aryl or arylalkyl, radicals $R^4$ are identical or different and are each $C_1$–$C_{20}$-alkyl and n is 1, 2 or 3. Particularly preferred compounds are those in which $R^3$ is $C_1$–$C_8$-alkyl or 5- to 7-membered cycloalkyl, $R^4$ is $C_1$–$C_4$-alkyl and n is 1 or 2.

Among these compounds, dimethoxydiisopropylsilane, dimethoxyisopropyl-sec-butylsilane, dimethoxyisobutylisopropylsilane, dimethoxydiisobutylsilane, dimethoxydicyclopentylsilane and diethoxyisobutylisopropylsilane are noteworthy.

Preferably used catalyst systems are those in which the atomic ratio of aluminum from the aluminum compound d) to titanium from the titanium-containing solid component is from 1:1 to 800:1, in particular from 2:1 to 200:1, and the molar ratio of the aluminum compound d) to the electron donor compound c') used as a cocatalyst is from 1:1 to 100:1, in particular from 2:1 to 80:1.

The components a), a'), b) and c) together form the transition metal-containing catalyst solid which, together with d) and, if required, c'), constitute the Ziegler-Natta catalyst system. The catalyst components d) and, if required, c') may be introduced into the polymerization reactor together with the titanium-containing solid component or as a mixture or individually in any desired order.

The metallocene catalyst systems which may be used in the novel process contain, as a rule, an inorganic carrier A), at least one metallocene complex B), at least one compound C) forming metallocenium ions and, if required, at least one organic metal compound D) of an alkali metal or alkaline earth metal or of a metal of main group III of the Periodic Table.

Essentially the same inorganic carrier as component a) of the Ziegler-Natta catalyst systems may be used as component A) of the metallocene catalyst system.

From 0.1 to 10000, in particular from 5 to 200, µmol of the metallocene complex, ie. of component B), are preferably used per gram of carrier, ie. of component A).

The metallocene catalyst system contains, as component B), at least one metallocene complex or a plurality of metallocene complexes. Particularly suitable are those of the general formula III

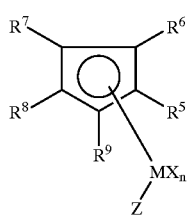

where

M is titanium, zirconium, hafnium, vanadium, niobium or tantalum or an element of subgroup III of the Periodic Table or one of the lanthanoids, X is fluorine, chlorine, bromine, iodine, hydrogen, $C_1$–$C_{10}$-alkyl, $C_6$–$C_{15}$-aryl, alkylaryl where the alkyl radical is of 1 to 10 carbon atoms and the aryl radical is of 6 to 20 carbon atoms, —$OR^{10}$ or —$NR^{10}R^{11}$, n is an integer from 1 to 3, n corresponding to the valency of M minus 2, $R^{10}$ and $R^{11}$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical, $R^5$ to $R^9$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, where two neighboring radicals together may furthermore be a saturated or unsaturated cyclic group of 4 to 15 carbon atoms, or $Si(R^{12})_3$, $R^{12}$ may be $C_1$–$C_{10}$-alkyl, $C_3$–$C_1$-cycloalkyl or $C_6$–$C_{15}$-aryl,

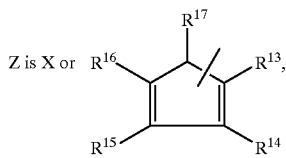

Z is X or $R^{13}$ to $R^{17}$ are each hydrogen, $C_1$–$C_{10}$-alkyl, 5-membered to 7-membered cycloalkyl, which in turn may carry $C_1$–$C_{10}$-alkyl as a substituent, $C_6$–$C_{15}$-aryl or arylalkyl, where two neighboring radicals together may furthermore be a saturated or unsaturated cyclic group of 4 to 15 carbon atoms, or $Si(R^{18})_3$, $R^{18}$ is $C_1$–$C_{10}$-alkyl, $C_6$–$C_{15}$-aryl or $C_3$–$C_{10}$-cycloalkyl, or $R^8$ and Z together form a group —$R^{19}$—A—, where

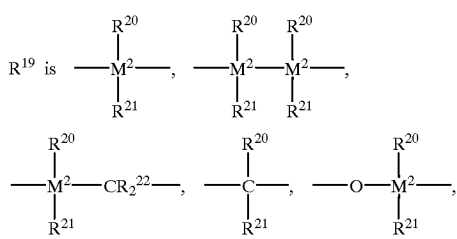

$R^{19}$ is

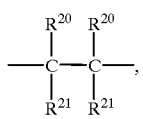

$=BR^{20}$, $=AlR^{20}$, —Ge—, —Sn—, —O—, —S—, $=SO$, $=SO_2$, $=NR^{20}$, $=CO$, $=PR^{20}$ or $=P(O)R^{20}$, $R^{20}$, $R^{21}$ and $R^{22}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or two neighboring radicals together with the atoms linking them form a ring, and $M^2$ is silicon, germanium or tin,

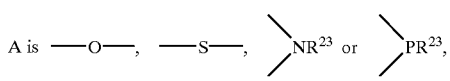

$R^{23}$ is $C_1$–$C_{10}$-alkyl, $C_6$–$C_{15}$-aryl, $C_3$–$C_{10}$-cycloalkyl, alkylaryl or $Si(R^{24})_3$, and $R^{24}$ is hydrogen, $C_1$–$C_{10}$-alkyl, $C_6$–$C_{15}$-aryl, which in turn may be substituted by $C_1$–$C_4$-alkyl, or $C_3$–$C_{10}$-cycloalkyl, or $R^8$ and $R^{16}$ together form a group —$R^{19}$—.

Among the metallocene complexes of the general formula III,

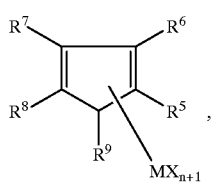

IIIa

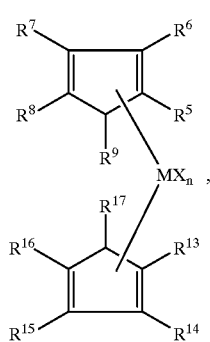

IIIb

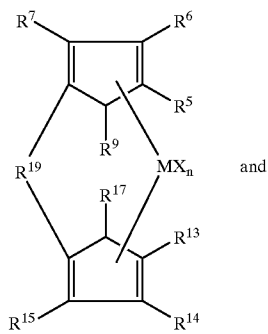

IIIc and

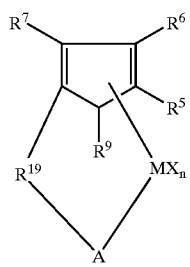

IIId are preferred.

The radicals X may be identical or different but preferably identical.

Particularly preferred compounds of the formula IIIa are those in which

M is titanium, zirconium or hafnium,

X is chlorine, $C_1$–$C_4$-alkyl or phenyl, n is 2 and $R^5$ to $R^9$ are each hydrogen or $C_1$–$C_4$-alkyl.

Preferred compounds of the formula IIIb are those in which

M is titanium, zirconium or hafnium,

X is chlorine, $C_1$–$C_4$-alkyl or phenyl, n is 2, $R^5$ to $R^9$ are each hydrogen, $C_1$–$C_4$-alkyl or $Si(R^{12})_3$ and $R^{13}$ to $R^{17}$ are each hydrogen, $C_1$–$C_4$-alkyl or $Si(R^{18})_3$.

Particularly suitable compounds of the formula IIIb are those in which the cyclopentadienyl radicals are identical. Examples of particularly suitable compounds include bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and the corresponding dimethylzirconium compounds.

Particularly suitable compounds of the formula IIIc are those in which $R^5$ and $R^{13}$ are identical and are each hydrogen or $C_1$–$C_{10}$-alkyl, $R^9$ and $R^{17}$ are identical and are each hydrogen, methyl, ethyl, isopropyl or tert-butyl, $R^7$ and $R^{15}$ are each $C_1$–$C_4$-alkyl, $R^6$ and $R^{14}$ are each hydrogen or two neighboring radicals $R^6$ and $R^7$ on the one hand and $R^{14}$ and $R^{15}$ on the other hand are together a cyclic group of 4 to 12 carbon atoms,

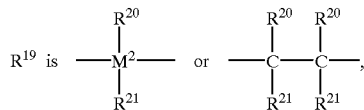

M is titanium, zirconium or hafnium and

X is chlorine, $C_1$–$C_4$-alkyl or phenyl.

Examples of particularly suitable complex compounds include dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(3-tert-butyl-5-methylcyclopentadienyl)zirconium dichloride, dimethylsilanediylbis(3-tert-butyl-5-ethylcyclopentadienyl)zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(3-methyl-5-methylcyclopentadienyl)zirconium dichloride, dimethylsilanediylbis(3-ethyl-5-isopropylcyclopentadienyl)zirconium dichloride, dimethylsilanediylbis(2-ethylindenyl)zirconium dichloride, dimethylsilanediylbis(2-methylbenzindenyl)zirconium dichloride dimethylsilanediylbis(2-ethylbenzindenyl)zirconium dichloride, methylphenylsilanediylbis(2-ethylbenzindenyl)zirconium dichloride, methylphenylsilanediylbis(2-methylbenzindenyl) zirconium dichloride, diphenylsilanediylbis(2-methylbenzindenyl)zirconium dichloride, diphenylsilanediylbis(2-ethylbenzindenyl)zirconium dichloride, and diphenylsilanediylbis(2-methylindenyl)hafnium dichloride and the corresponding dimethylzirconium compounds.

Further examples of suitable complex compounds include dimethylsilanediylbis(2-methyl-4-phenylindenyl) zirconium dichloride, dimethylsilanediylbis(2-methyl-4-naphthylindenyl) zirconium dichloride, dimethylsilanediylbis(2-methyl-4-isopropylindenyl) zirconium dichloride and dimethylsilanediylbis(2-methyl-4,6-diisopropylindenyl) zirconium dichloride and the corresponding dimethylzirconium compounds.

Examples of particularly suitable compounds of the general formula IIId are those in which M is titanium or zirconium, X is chlorine, $C_1$–$C_4$-alkyl or phenyl,

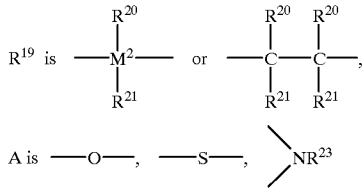

and $R^5$ to $R^7$ and $R^9$ are each hydrogen, $C_1$–$C_{10}$-alkyl, $C_3$–$C_{10}$-cycloalkyl, $C_6$–$C_{15}$-aryl or $Si(R^{12})_3$, or the two neighboring radicals are a cyclic group of 4 to 12 carbon atoms.

The synthesis of these complex compounds can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in J. Organometal. Chem., 369 (1989), 359–370.

Mixtures of different metallocene complexes may also be used.

The metallocene catalyst system contains, as component C), a compound forming metallocenium ions.

Suitable compounds forming metallocenium ions are strong, neutral Lewis acids, ionic compounds having Lewis acid cations and ionic compounds having Brönsted acids as cations.

Preferred strong, neutral Lewis acids are compounds of the general formula IV $$M^3 X^1 X^2 X^3 \qquad \qquad IV$$

where $M^3$ is an element of main group III of the Periodic Table, in particular B, Al or Ga, preferably B, and $X^1$, $X^2$ and $X^3$ are each hydrogen, $C_1$–$C_{10}$-alkyl, $C_6$–$C_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred compounds of the general formula IV are those in which $X^1$, $X^2$ and $X^3$ are identical, preferably tris(pentafluorophenyl)borane.

Suitable ionic compounds having Lewis acid cations are those of the general formula V $$[(Y^{a+}) Q_1 Q_2 \ldots Q_z]^{d+} \qquad \qquad V$$

where

Y is an element of main group I to VI or of subgroup I to VIII of the Periodic Table, $Q_1$ to $Q_z$ are each a radical having a single negative charge, such as $C_1$–$C_{28}$-alkyl, $C_6$–$C_{15}$-aryl, alkylaryl, arylalkyl, haloalkyl, haloaryl, each having 6 to 20 carbon atoms in the aryl radical and 1 to 28 carbon atoms in the alkyl radical, $C_3$–$C_{10}$-cycloalkyl, which may be substituted by $C_1$–$C_{10}$-alkyl, or halogen, $C_1$–$C_{28}$-alkoxy, $C_6$–$C_{15}$-aryloxy, silyl or mercaptyl, a is an integer from 1 to 6, z is an integer from 0 to 5 and d corresponds to the difference a–z, but d is greater than or equal to 1.

Carbonium cations, oxonium cations and sulfonium cations as well as cationic transition metal complexes are particularly suitable.

Particular examples are the triphenylmethyl cation, the silver cation and the 1,1'-dimethylferrocenyl cation. They preferably have noncoordinating opposite ions, in particular boron compounds, as also stated in WO 91/09882, preferably tetrakis(pentafluorophenyl)borate.

Ionic compounds having Brönsted acids as cations and preferably also noncoordinating opposite ions are mentioned in WO 91/09882, a preferred cation being N,N-dimethylanilinium.

The amount of compounds forming metallocenium ions, of general formulae IV and V, is preferably from 0.1 to 10 equivalents, based on the metallocene complex B).

Particularly suitable compounds C) forming metallocenium ions are open-chain or cyclic aluminoxane compounds of the general formula VI or VII

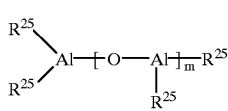

VI

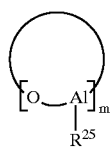

VII where $R^{25}$ is $C_1$–$C_4$-alkyl, preferably methyl or ethyl, and m is an integer from 5 to 30, preferably from 10 to 25.

The preparation of these oligomeric aluminoxane compounds is usually carried out by reacting a solution of a trialkylaluminum with water and is described, inter alia, in EP-A 284 708 and U.S. Pat. No. 4,794,096.

As a rule, the oligomeric aluminoxane compounds obtained are in the form of mixtures of both linear and cyclic chain molecules of different lengths, so that m is to be regarded as an average value. The aluminoxane compounds may also be present as a mixture with other metal alkyls, preferably with alkylaluminums.

It is therefore advantageous to use the metallocene complexes B) and the oligomeric aluminoxane compounds of the general formula VI or VII in amounts such that the atomic ratio of aluminum from the oligomeric aluminoxane compounds to the transition metal from the metallocene complexes is from 10:1 to $10^6$:1, in particular from 10:1 to $10^4$:1.

Furthermore, instead of the aluminoxane compounds of the general formula VI or VII, aryloxyaluminoxanes, as described in U.S. Pat. No. 5,391,793, aminoaluminoxanes, as described in U.S. Pat. No. 5,371,260, aminoaluminoxane hydrochlorides, as described in EP-A 633 264, silyloxyaluminoxanes, as described in EP-A 621 279, or mixtures thereof may be used as component C).

Preferably, both the metallocene complexes (component B) and the compounds forming metallocenium ions (component C) are used in solution, aromatic hydrocarbons of 6 to 20 carbon atoms, in particular xylenes and toluene, being particularly preferred.

If required, the metallocene catalyst system used may contain, as further component D), a metal compound of the general formula VIII

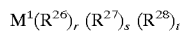

VIII where $M^1$ is an alkali metal, an alkaline earth metal or a metal of main group III of the Periodic Table, ie. boron, aluminum, gallium, indium or thallium, $R^{26}$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical, $R^{27}$ and $R^{28}$ are each hydrogen, halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical, r is an integer from 1 to 3 and s and t are each an integer from 0 to 2, the sum r+s+t corresponding to the valency of $M^1$.

Preferred metal compounds of the general formula VIII are those in which $M^1$ is lithium, magnesium or aluminum and $R^{27}$ and $R^{28}$ are each $C_1$–$C_{10}$-alkyl.

Particularly preferred metal compounds of the formula VIII are n-butyllithium, n-butyl-n-octylmagnesium, n-butyl-n-heptylmagnesium, tri-n-hexylaluminum, tri-isobutylaluminum, triethylaluminum and trimethylaluminum.

If the component D) is used, it is preferably present in an amount of from 800:1 to 1:1, in particular from 500:1 to 50:1 (molar ratio of $M^1$ from VIII to transition metal M from III) in the catalyst system.

The components A) and B) of the metallocene catalyst system together form the transition metal-containing catalyst solid, which however may additionally contain further components C) and D) of the metallocene catalyst system. As a rule, further components C) and/or D) are added separately during polymerization, in addition to the transition metal-containing catalyst solid.

Such catalyst systems comprising the components a), a'), b), c), d) and, if required, c') or comprising the components A), B), C) and D) are preferably used in the novel process for polymerization of $C_2$–$C_8$-alk-1-enes.

The components d) and, if required, c') or C) and D) of the catalyst systems used, which are not contained in the transition metal-containing catalyst solids, can be introduced, together with the transition metal-containing solid component, into the polymerization reactor by means of the same $C_2$–$C_8$-alk-1-ene stream or separately, either as a mixture or individually in any desired order.

Apart from the novel method of addition of the transition metal-containing catalyst solid, the polymerization is carried out under conventional reaction conditions at from 40 to 120° C. and from 1 to 100 bar. Temperatures of from. 40 to 100° C. and pressures of from 10 to 50 bar are preferred. The molar mass of the resulting polymers of the $C_2$–$C_8$-alk-1-enes can be controlled and regulated by the addition of regulators usually used in polymerization technology, for example hydrogen. The polymers of the $C_2$–$C_8$-alk-l-enes have, as a rule, a melt flow index of from 0.1 to 100 g/10 min, at 230° C. and under a weight of 2.16 kg. The melt flow index corresponds to the amount of polymer which is forced, in the course of 10 minutes at 230° C. and under a weight of 2.16 kg, out of the test apparatus standardized according to ISO 1133. Particularly preferred propylene polymers are those whose melt flow index is from 0.1 to 20 g/10 min at 230° C. and under a weight of 2.16 kg.

If the novel process is carried out in a two-stage polymerization in two reactors, pressures of from 17 to 35 bar and temperatures of from 65 to 110° C. are preferred in the first reactor and pressures of from 10 to 25 bar and temperatures of from 40 to 80° C. in the second reactor. Hydrogen may be used as a molecular weight regulator in both reactors. The pressure in the first reactor should advantageously be at least 10, in particular at least 7, bar higher than the pressure in the second reactor.

The average residence times are in general from 0.5 to 5, preferably from 0.6 to 4, in particular from 0.7 to 3, hours. In the case of multistage polymerizations, they are as a rule from 0.5 to 5, particularly preferably from 0.7 to 3, hours in the first reactor and from 0.25 to 4, particularly preferably from 0.35 to 2.5, hours in the second reactor.

With the aid of the novel process, $C_2$–$C_8$-alk-1-enes can be polymerized in the presence of a Ziegler-Natta or metallocene catalyst system with substantially better mixing in of the transition metal-containing solid component. As a result, the mixing times are reduced. In particular, this gives a substantially better and more homogeneous temperature distribution, from which a considerable increase in productivity results. The process is particularly suitable for the preparation of random copolymers of propylene with minor amounts of comonomers, such as ethylene and/or but-1-ene.

The novel process or the novel apparatus can be used to prepare various types of polymers of $C_2$–$C_8$-alk-1-enes, for example homopolymers, copolymers or mixtures of such polymers. These are particularly suitable for the production of films, fibers and moldings.

EXAMPLES

Example 1

For the preparation of a polypropylene homopolymer, a reactor having a capacity of 12.5 m³ and a self-supporting helical ribbon impeller was used. The reactor was filled with about 3.2 t of a propylene homopolymer powder, which was kept in motion with the aid of the helical ribbon impeller at a speed of about 40 revolutions per minute.

In this reactor, a propylene homopolymer was prepared at 30 bar and 80° C. A titanium-containing catalyst solid prepared according to U.S. Pat. No. 5,288,824, together with the catalyst components triethylaluminum d) and isobutylisopropyldimethoxysilane c'), was used as the catalyst system. Very pure hydrogen was metered in for regulating the molar mass.

The resulting fine-particled, dry polymer was discharged quasicontinuously from the reactor after an average residence time of 2 hours, with unconverted monomer, through periodically briefly opening discharge valves. The discharge frequency was regulated by means of a radiometric level measurement.

The titanium-containing catalyst solid was added with the freshly introduced propylene, via a pipe projecting perpendicularly from above into the gas space of the reactor, in the middle of the reactor, the distance from the pipe end to the pulverulent reactor bed being 5–10% of the distance between the reactor bed and the upper reactor end, depending on the reactor level.

The propylene homopolymer powder obtained had a melt flow index of 13.1 g/10 min at 2.16 kg and 230° C. (according to ISO 1133).

The productivity of the catalyst system was determined on the basis of the determination of the residual content of chlorine in the product in relation to the chlorine content of the titanium-containing solid component. It is shown in the Table below.

The temperature distribution in the reactor was determined by means of two rods which projected perpendicularly into the pulverulent reactor bed and to each of which 12 equally spaced temperature-measuring elements had been fastened. The average temperature difference between the measuring elements with the highest and the lowest temperature which were still completely immersed in the pulverulent reactor bed was evaluated as a measure of the temperature inhomogeneity. This temperature difference is shown in the Table below.

Comparative Example A

Propylene was homopolymerized similarly to Example 1 in a gas-phase reactor having a capacity of 12.5 m³, using the same catalyst system, except that the freshly added propylene was introduced into the reactor from the side, together with the titanium-containing catalyst solid, the addition being effected at a height corresponding roughly to the middle of the pulverulent reactor bed.

The propylene homopolymer powder obtained had a melt flow index of 12.7 g/10 min at 2.16 kg and 230° C. (according to ISO 1133).

The productivity of the catalyst and the temperature inhomogeneity are shown in the Table below.

Example 2

For the preparation of a random propylene/ethylene copolymer, a reactor which had a capacity of 12.5 m³ and a self-supporting helical ribbon impeller was used. The reactor was filled with about 3.2 t of a propylene/ethylene copolymer powder, which was kept in motion with the aid of the helical ribbon impeller at a speed of about 40 revolutions per minute.

A titanium-containing catalyst solid prepared according to U.S. Pat. No. 5,288,824, together with the catalyst components triethylaluminum d) and isobutylisopropyldimethoxysilane c'), was used as the catalyst system. Very pure hydrogen was metered in for regulating the molar mass.

The propylene/ethylene copolymer was prepared by polymerization at 25 bar and 80° C. The addition of the titanium-containing catalyst solid was effected by means of the freshly introduced propylene, via a pipe projecting perpendicularly from above into the gas space of the reactor, in the middle of the reactor, the distance from the pipe end to the pulverulent reactor bed being 5–10% of the distance between the reactor bed and the upper reactor end, depending on the reactor level. At the same time, gaseous ethylene was passed into the reactor in an amount such that the ratio of the partial pressure of propylene to that of ethylene in the reactor was constant at 89:1.

The resulting fine-particled, dry polymer was discharged quasicontinuously from the reactor after an average residence time of 2 hours, with unconverted monomer, through periodically briefly opening discharge valves. The discharge frequency was regulated by means of a radiometric level measurement.

The propylene/ethylene copolymer powder obtained had a melt flow index of 8.4 g/10 min at 2.16 kg and 230° C. (according to ISO 1133).

The productivity of the catalyst system and the temperature inhomogeneity were determined similarly to Example 1. The values are shown in the Table.

COMPARATIVE EXAMPLE B

Propylene and ethylene were copolymerized similarly to Example 2 in a gas-phase reactor having a capacity of 12.5 m$^3$, using the same catalyst system, except that the freshly added propylene was introduced together with the titanium-containing catalyst solid similarly to Comparative Example A.

The propylene/ethylene copolymer powder obtained had a melt flow index of 7.6 g/10 min at 2.16 kg and 230° C. (according to ISO 1133).

The productivity of the catalyst and the temperature inhomogeneity are shown in the Table below.

TABLE

|  | Example 1 | Comp. Example 1 | Example 2 | Comp. Example 2 |
|---|---|---|---|---|
| Productivity of the catalyst (g of PP/g of titanium-containing solid component) | 21,200 | 15,800 | 24,800 | 18,400 |
| Temperature inhomogeneity (° C.) | 3 | 9 | 5 | 11 |

The values stated in the Table show that a substantially better productivity is obtained and the temperature inhomogeneity in the reactor is smaller as a result of the novel catalyst addition.

We claim:

1. A process for the homo- or copolymerization of $C_2$–$C_8$-alk-1-enes by means of a Ziegler-Natta or a metallocene catalyst system in a stirred bed of finely divided polymer from the gas phase which is kept in motion by means of a stirrer, the transition metal-containing catalyst solid of the Ziegler-Natta or metallocene catalyst system being fed to the reactor with a $C_2$–$C_8$-alk-1-ene metered into the reactor, wherein the transition metal-containing catalyst solid, together with at least some of the $C_2$–$C_8$-alk-1-ene, is fed to the reactor through one or more pipes which project perpendicularly or virtually perpendicularly from above into the gas space and end above the pulverulent stirred reactor bed whereby the inclination of the pipes relative to the vertical (reactor middle) should be less than 30° and wherein the vertical distance between the pipe end or ends and the surface of the stirred reactor bed is less than 15% of the distance between the upper reactor end and the stirred reactor bed.

2. A process as claimed in claim 1, wherein the vertical distance between the pipe end or ends and the stirred reactor bed is less than 10% of the distance between the upper reactor end and the stirred reactor bed.

3. A process as claimed in claim 1, wherein, viewed in the radial direction, the feed pipe or pipes ends or end in the middle of the reactor or eccentrically so that the horizontal distance between the pipe end or ends and the middle of the reactor is less than 20% of the radius of the reactor.

4. A process as claimed in claim 3, wherein the horizontal distance between the pipe end or ends and the middle of the reactor is less than 15% of the radius of the reactor.

5. A process as claimed in claim 1, wherein the pulverulent reactor bed is kept in motion by a self-supporting helical ribbon impeller.

* * * * *

UNITED STATES PATENT AND TRADEMARK OFFICE
CERTIFICATE OF CORRECTION

PATENT NO.: 6,114,478

DATED: September 5, 2000

INVENTOR(S): KERSTING et al.

It is certified that error appears in the above-identified patent and that said Letters Patent is hereby corrected as shown below:

On the cover page, item [54], the title should read:
--GAS-PHASE POLYMERIZATION OF $C_2$-$C_8$-ALK-1-ENES BY MEANS OF ZIEGLER-NATTA OR METALLOCENE CATALYST SYSTEMS--.

On the cover page, item [30], "Sep. 25, 1997" should be --Dec. 19, 1996--.

Col. 16, claim 1, line 14, after "reactor bed" insert a comma --,--.

Signed and Sealed this

Twenty-ninth Day of May, 2001

Attest:

NICHOLAS P. GODICI

Attesting Officer

Acting Director of the United States Patent and Trademark Office